United States Patent [19]
Noto

[11] Patent Number: 4,586,488
[45] Date of Patent: May 6, 1986

[54] REFLECTIVE SOLAR TRACKING SYSTEM

[76] Inventor: Vincent H. Noto, 2752 Imperial Ave., San Diego, Calif. 92102

[21] Appl. No.: 561,880

[22] Filed: Dec. 15, 1983

[51] Int. Cl.⁴ .............................. F24J 3/02; G01J 1/20
[52] U.S. Cl. .................................... 126/425; 126/438; 250/203 R
[58] Field of Search ....................... 126/424, 425, 438; 250/203 R; 353/3

[56] References Cited
U.S. PATENT DOCUMENTS 4,192,289  3/1980  Clark .................................. 126/425
4,227,513 10/1980  Blake .................................. 126/425

Primary Examiner—William E. Lyddane
Assistant Examiner—G. Anderson
Attorney, Agent, or Firm—Charmasson & Holz

[57] ABSTRACT

A reflective solar tracking system of the type arranged to reflect light rays from the sun onto a remote solar energy collector is described. The system comprises a reflector mounted on an assembly incorporating a drive mechanism for rotating the reflector about two axes to compensate for altitudinal and azimuthal changes in the position of the sun. A sensor device is adapted to point at the sun and provide control signals to the drive mechanism so that the reflector is moved in response to solar movement such that sunlight is always reflected onto the collector and at the same time the sensor device is moved so as to track the sun.

11 Claims, 5 Drawing Figures

REFLECTIVE SOLAR TRACKING SYSTEM

BACKGROUND OF THE INVENTION

The present invention relates to a reflective solar tracking system for reflecting light rays from the sun onto a solar energy collector. The system tracks the sun as it moves across the sky so that light rays are always reflected onto the collector.

One reflective-type solar tracking system is shown in U.S. Pat. No. 4,063,543 of Hedger. In this system a major reflector is mounted so as to be movable in both a North/South and East/West direction. The motion is controlled by the reflection of light rays from the reflector onto a position-detecting target via a second, minor reflector. When the rays are reflected onto a neutral position on the target, the major reflector is positioned to direct light rays onto the collector. When the rays are reflected off the neutral position, the major reflector is repositioned on one or both directions until light rays are again directed onto the collector.

There have been many servo control tracking devices in solar energy collection devices in the prior art. Many however, are applied to systems that move the entire collector array rather than a reflector device for a remote target which offers the advantage of the light weight, mobility and low power requirements to operate the moving reflective parts while the heavier collector array can remain stationary. An example of such a device where the whole collector array is movable is Russell U.S. Pat. No. 4,290,411. The advantages of a fixed collector and a movable reflector have been recognized before in such art as Hedger which involves an additional aiming reflective subsystem. Such systems suffer from alignment difficulties which can disturb the tracking function and because in Hedger alignment of the main reflector and the subsystem aiming reflector involve two alignments, the problem is compounded. The present invention seeks to reduce alignment errors by improvement of system rigidity, simplification of the tracking computation, and operability through any range of sun positioning without major intervention or adjustment.

SUMMARY OF THE INVENTION

It is an object of the present invention to provide a reflective solar tracking system which automatically tracks the sun to maintain a position in which light rays from the sun are directed onto a solar energy collector.

It is a further object of the present invention to provide such a system which is relatively simple in construction, operation, and simple or operational computation.

According to the present invention a reflective solar tracking system is provided which is adapted to reflect light rays from the sun onto a remote, stationary solar energy collector, the system comprising a reflector for reflecting light rays onto the collector, a mounting assembly for movably mounting the reflector relative to the collector, a sensor device for pointing at the sun and sensing altitudinal and azimuthal changes in the sun's position and producing control signals in response to such position changes, and a drive mechanism operatively linked to the sensor device and the reflector for moving the sensor device and the reflector in response to the control signals so that the sensor device tracks the sun and the reflector moves to maintain a position in which it reflects light rays from the sun onto the collector. The reflector is mounted on the mounting assembly so as to be rotatable about a first axis adapted to point at the collector, and about a second axis transverse to the first for controlling elevational tilt of the reflector. The sensor device is also mounted in the mounting assembly such that its pointing direction is rotatable about the first axis to control its azimuthal pointing direction, and is also rotatable about an axis transverse to the first axis to control its elevational pointing direction.

Thus by having a first axis of rotation pointing at the collector both the reflector and the sensor device can be mounted on the same mounting assembly even though their motions in tracking the sun are different. The motions are different because, in a reflective solar tracking system, the sensor device must move to always point at the sun while the reflector must move so as to point at the angular mid-point between the sun and the collector. In this position light rays are reflected onto the collector.

The calculation of the proper adjustment of the reflective device to compensate for a movement of the sun would be simple if the sun were only to move altitudinaly within a plane that passes through three points: the sun's mid-point, the mid-point of the collector, and the center or focal point of the moving reflected mirror, in that case the angular movement of the mirror would be one half the angular movement of the sun, since the angle of reflection equals the angle of incidence. For instance, a change in the sun's position of two degrees within this plane would only require a one degree angular movement of the mirror since that would change the angle of reflection and the angle of incidence by one degree, the total of two degree compensation. However, since the sun's azimuth and altitude are changing at the same time the orientation of the plane formed by the sun reflector in mirror points is not constant. This system seeks to preserve the simplicity of the one half angle adjustment formula in altitude by first rotating the entire center to bring the reflecting plane into alignment with the sun's new position. The construction of the within device can be conceptually understood by dividing the two adjustments into these components: first rotation of the reflecting plane of an angle equal to the angular movement of that reflecting plane, and second adjustment within the plane of one half the altitudinal angular change of the sun. The first angle can be compensated by rotation of the reflecting mirror and the second angle can be compensated by one half angle adjustment in tilt of the reflecting mirror.

In a preferred embodiment of the invention the mounting assembly is adapted to point along the first axis through the center point of the reflector, and includes a member rotatable about the first axis. The reflector and sensor device are mounted on the rotatable member. A mounting shaft for the reflector extends transversely through the rotatable member along the second axis. Thus rotation about the shaft controls elevational tilt of the reflector, and rotation of the rotatable member controls the azimuthal pointing direction of the reflector. The sensor device is mounted in the rotatable member along a mounting axis transverse to the member and to the sensor pointing direction. The sensor device is rotatable about the mounting axis to control its elevational tilt and rotation of the member itself about the first axis will control the azimuthal pointing direction of the sensor device.

The drive mechanism can be simply arranged to provide the correct rotations for the system. It is arranged to rotate the reflector and sensor pointing direction about the first axis to follow azimuthal position changes of the sun. The drive mechanism is also arranged to rotate the sensor device and reflector in an elevational direction in a two to one drive ratio, so that the reflector will tilt through an angle equal to half that through which the sun moves in an altitudinal direction. This ensures that the reflector always points to the angular mid-point between the sun and the collector.

Any position change of the sun will include altitudinal and elevational components, so the actual adjustment of the system to follow the position change will be a combination of the two types of rotation. The system therefore compensates automatically for position changes of the sun so that the sensor device tracks the sun and the reflector maintains a position for reflecting light rays onto the collector.

Although the motions of the reflector and sensor device in the reflective solar tracking system of this invention are relatively complex, and the reflector cannot be arranged to simply track the sensor device, these motions are provided according to the invention in a single mounting assembly.

The sensor device preferably includes a first part for detecting changes in the azimuthal position of the sun and a second part for detecting changes in the altitudinal position of the sun. Each part produces a respective control signal for the drive mechanism, controls signals from the first part operating to rotate the reflector about the first axis and control signals from the second part operating to rotate the reflector about the second axis. In a preferred embodiment the sensor device includes an array of four symmetrically arranged solar cell sensors, one pair of the sensors being aligned in an azimuthal direction and the other pair being aligned in the altitudinal direction. The control signals are produced by changes in the amount of sunlight detected in each sensor of the respective pair. Separate arrays for rough and fine positioning may be provided.

Thus a simple feedback mechanism can be provided for controlling the relative rotations of the reflector and sensor device.

BRIEF DESCRIPTION OF THE DRAWINGS

The following is a brief description of the accompanying drawings which show a preferred embodiment of the invention.

DESCRIPTION OF THE PREFERRED EMBODIMENT OF THE INVENTION

Figure 1:
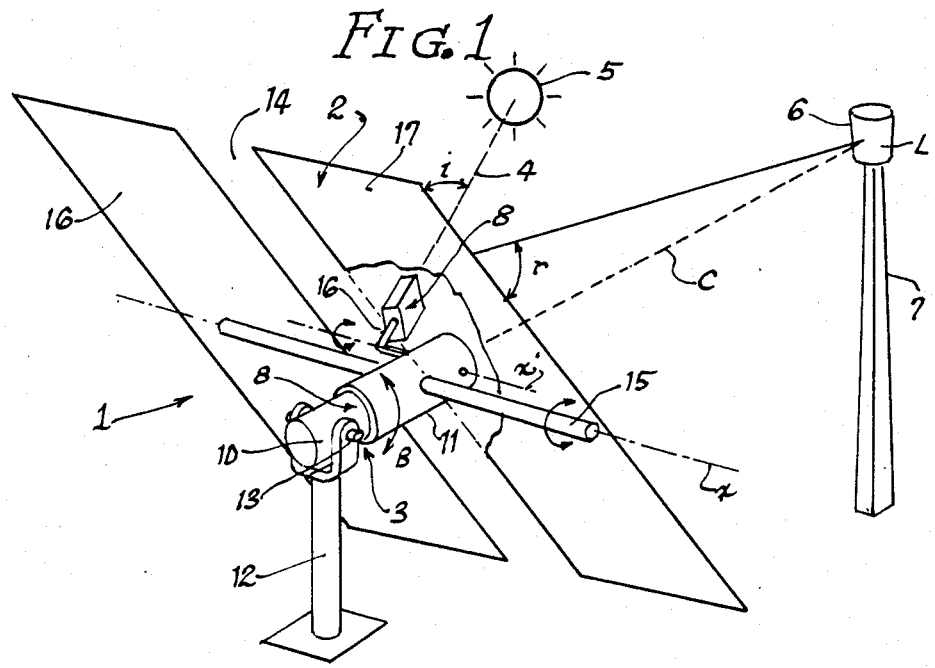
FIG. 1 is a schematic perspective view of the solar tracking system of the invention in relative alignment with the sun and a remote solar energy collector.

FIG. 1 shows a reflective solar tracking system 1 according to a preferred embodiment of the present invention.

The system 1 includes a generally planar reflector or mirror 2 mounted on a mounting assembly 3 and arranged to reflect rays 4 from the sun 5 onto a remote solar energy collector 6. The collector 6 may comprise any suitable device for collecting solar energy, such as a water or other fluid heater or a solar cell device. The collector is fixed in position on a remote tower 7.

A sensor device 8 is also mounted on mounting assembly 3 and is arranged to point at the sun 5 and track it as it moves across the sky. Signals from the sensor device 8 are used to control operation of a drive mechanism 9 (see FIGS. 3 and 6) to move the reflector 2 so that it accurately reflects rays from a series of solar positions on the collector 6.

For a simple solar collector tracking system, the collector itself is arranged to always point at the sun in order to receive the maximum amount of light. In a reflective type of system where the collector is stationary and the reflector moves, as in the present invention, the reflector must point at the mid-point in the sky between the collector and the sun in order to reflect light rays onto the collector. This is illustrated in FIG. 2 in two dimensions for changes in the altitudinal position of the sun.

Figure 2:
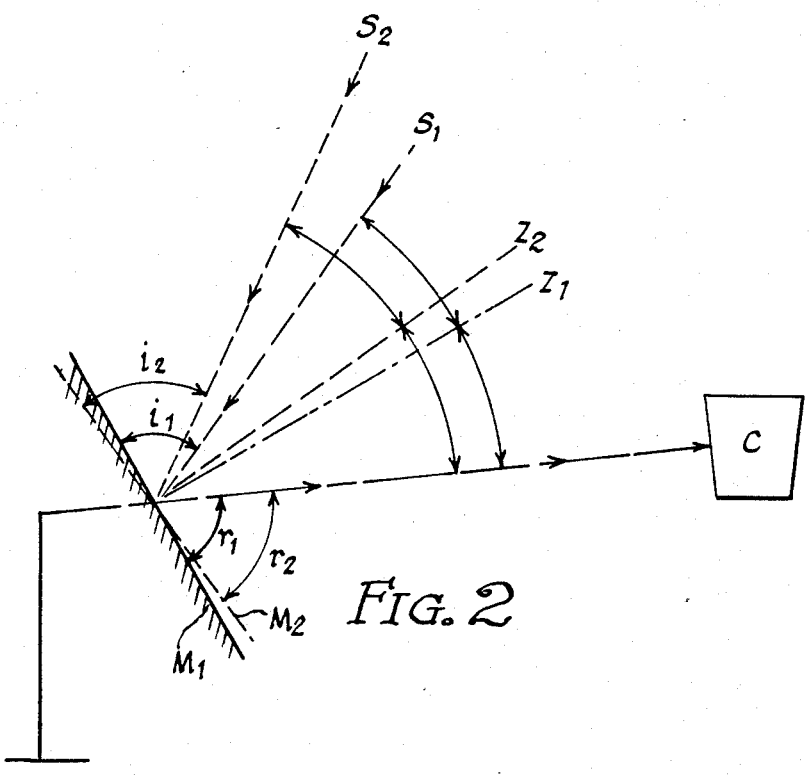
FIG. 2 is a schematic side view of the system showing tracking following a change in the sun's altitudinal position.

In FIG. 2, when the sun is in the first position $S_1$, the perpendicular to the reflector points at position $Z_1$ which is the angular mid-point between the sun 5, and the collector 6. In this position the angle $r_1$ between the reflector $M_1$ and the direction C of the collector 6 is equal to the angle of incidence $i_1$ of light rays onto the reflector $M_1$, so that incident light rays are reflected in direction C.

If the sun now changes its altitude by 10° to a new position $S_2$, the reflector must be tilted to a new position $M_2$ such that its perpendicular points to the new angular mid-point $Z_2$ between the sun $S_2$ and the collector 6. A 10° movement of the sun will shift the mid-point by 5°, so the reflector must change its tilt by an angle equal to half of the angle through which the sun moves.

Motion of the sun relative to the reflector and collector will not lie in a single plane as shown in FIG. 2, however, but will also have an azimuthal component (e.g. movement out of the plane of the drawing). When the sun shifts in azimuthal position out of the plane of the drawing, the perpendicular to the plane of the reflector will no longer point to the mid-point between the sun and the collector since this mid-point will also shift out of the plane of the drawing. The plane of the reflector must therefore be moved until the light rays are again directed at the collector 6. The reflector must therefore be moved to correct for azimuthal and altitudinal changes in the sun's position. The system shown in FIGS. 1 and 3 to 6 is arranged to correct for the altitudinal and azimuthal movements of the sun described above so that light rays are always directed at the collector 6.

The mounting assembly 3 for the reflector 2 comprises a cylindrical member 10 arranged to point along a first axis C through the center of the reflector at the collector 6, and a cylindrical sleeve 11 mounted on said member 10 so as to be rotatable about the axis C. The member 10 is rigidly mounted on a support 12 and an adjusting device 13 is provided for adjusting the pointing direction of the member 10 until it points in the direction C.

The sleeve 11 extends through a vertical slit 14 dividing the reflector 2 into two halves to point at the collector. A mounting shaft 15 for supporting the reflector extends transversely along a second axis X through the sleeve 11 and is secured across the rear faces of the two halves of the reflector on opposite sides of the sleeve. The shaft 15 is rotatably mounted in the sleeve.

It can be seen that this mounting provides for two directions of rotation of the reflector 2. If the shaft 15 is considered as the X-axis and the vertical slit 14 is considered as the Y-axis, rotation of the reflector about the X-axis will change the elevational tilt of the reflector. Rotation about the C-axis through the center of the reflector will change the azimuthal orientation of the reflector. The slit 14 allows the elevational tilt to be changed without interference with the mounting assembly projecting through the reflector, and also allows the sensor device 8 to move freely. Any opening transverse to the shaft 15 up to a complete slit 14 may be provided, as long as the opening provides the necessary freedom of motion of elevational tilt.

The sensor device 8 is also mounted on the assembly 3 in such a way that it can rotate in altitudinal and azimuthal directions. The sensor device 8 is adapted to point at the sun and is mounted on an L-shaped support rod 16. The rod 16 extends along a transverse mounting axis $X^1$ into the sleeve 11, and is mounted so as to be rotatable about this axis. The altitudinal pointing direction of the sensor device is changed by rotation about the axis $X^1$ and the azimuthal pointing direction will be changed when the sleeve 11 rotates.

Figure 3:
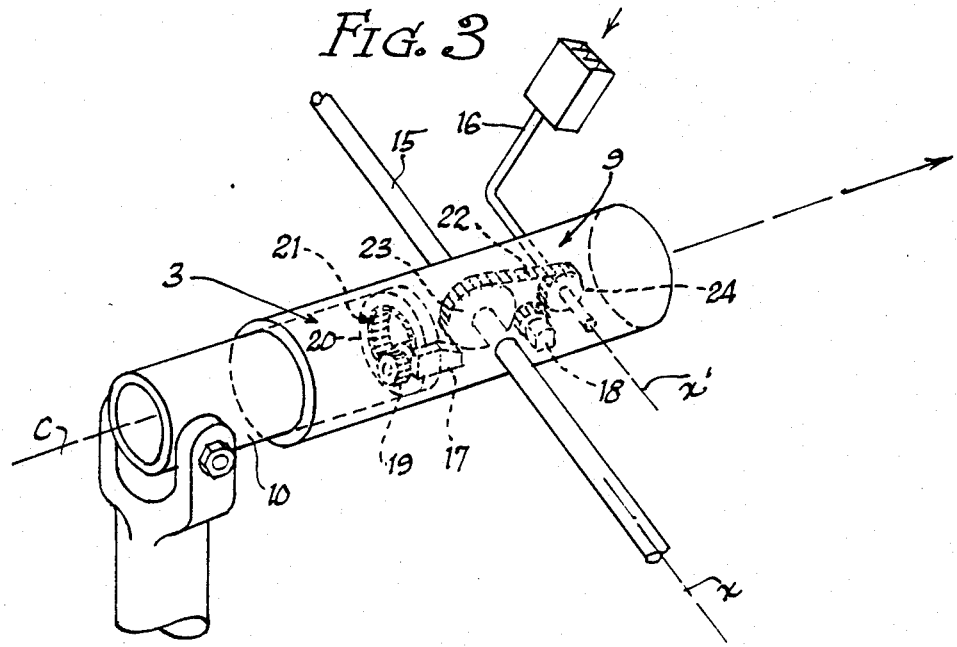
FIG. 3 is a side view in perspective, partially broken away, of the mounting assembly of the system.

The simple mounting assembly 3 allows the same drive mechanism 9 to drive both the sensor device 8 to track the sun and the reflector 2 to track the angular mid-point between the sun and the collector 6. The mechanism 9 is mounted in the sleeve 11 as shown in FIG. 3.

The drive mechanism 9 basically comprises a first servo motor 17 for controlling azimuthal rotations and a second servo motor 18 for controlling altitudinal rotations.

The first motor 17 operates to drive the sleeve 11 to rotate relative to the member 10. As shown in FIG. 3, the motor 17 is operatively linked to a gear wheel 19 which engages in an annular series of gear teeth 20 in an open inner end 21 of the member 10.

The second motor 18 is operatively linked through a continuous drive belt 22 to a first drive wheel 23 mounted on the reflector mounting shaft 15 and a second drive wheel 24 mounted on the sensor device support rod 16. There is a 2 to 1 drive ratio between the drive wheel 24 and the drive wheel 23, so that the motor 18 will rotate the rod 16 twice as far as the shaft 15.

Figure 4:
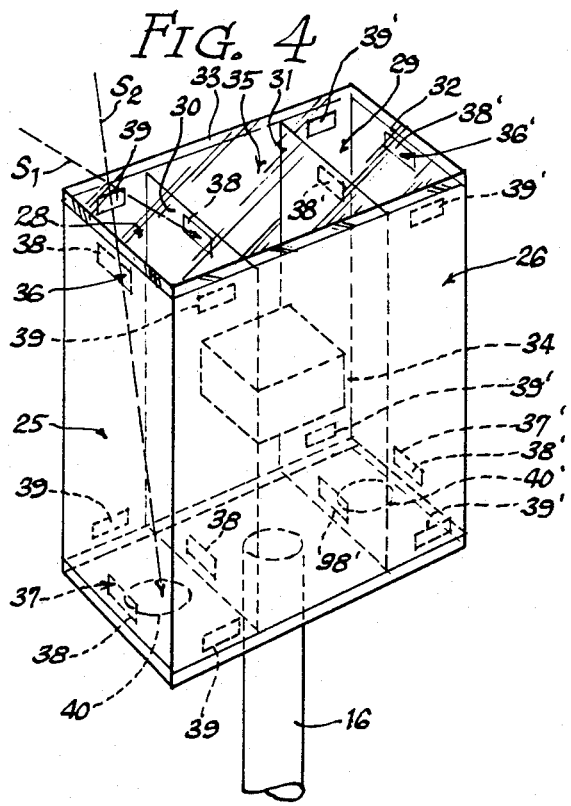
FIG. 4 is a perspective view of the sensor device of the system.

The servo motors 17 and 18 are operated in response to control signals from the sensor device 8. The sensor device 8 is shown in more detail in FIG. 4 is adapted to detect changes in the azimuthal and altitudinal positions of the sun. The sensor device 8 comprises two separate sensor assemblies 25 and 26 mounted side by side but spaced apart in a housing 27 of generally rectangular cross section. The assemblies 25 and 26 point in the same general direction and are each located in channel-like chambers 28 and 29, respectively, forward by spaced dividing walls 30 and 31 in the housing 27. The housing 27 is mounted on the support rod 16 as shown, and is open at its end 32 intended to face towards the sun. The open end 32 is protected by a glass cover 33.

The sensor assemblies 25 and 26 are identical and are connected to a comparator device 34 mounted in a chamber 35 defined between the dividing walls 30 and 31. The comparator device is arranged to compare signals from the various parts of the assemblies and produce corresponding signals to operate the servo motors 17 and 18, as will be described in more detail below.

Each sensor assembly includes an upper rectangular array 36, 36' and a lower rectangular array 37, 37' of solar cell sensors mounted in the side walls of its respective chamber 28, 29 at opposite ends of the chamber. Each rectangular array comprises a first pair of solar cell sensors 38, 38' mounted in opposite side walls so as to face each other in a first direction, and a second pair of solar cell sensors 39, 39' mounted so as to face each other in a second direction perpendicular to the first direction. A circular solar cell sensor 40, 40' is mounted in the lower wall of each of the chambers 28, 29, respectively.

The upper arrays of sensors 36 and 36' are arranged to detect rays from the sun coming from the side, for example form direction $S_1$ shown in FIG. 4. When the sunlight is more or less directly above the sensor device 8, sunlight will fall into the sensor chambers 28 and 29, for example in direction $S_2$ shown in FIG. 4, and will strike the lower sensors 40 and 40'. Signals from the sensors 40 and 40' are arranged to de-activate the upper arrays of sensors, which will no longer be receiving direct light, and to activate the lower arrays of sensors 37 and 37'.

In each array, one pair of sensors 38 is arranged to detect altitudinal changes in the sun's position, and the other pair 39 is arranged to detect azimuthal changes in the sun's position. Control signals are produced by the comparator device 34 in response to changes in the amount of sunlight received by each sensor of the respective pairs, and these signals are used to drive the servo motors 17 and 18 so that the sensor device 8 tracks the sun.

Considering the sensor assembly 25, when the sunlight is coming from one side of the housing in direction $S_1$, one of the sensors of the pair 38 in the upper array 36 will receive considerably more sunlight than the other. This difference is detected by the comparator device and used in a feedback mechanism to energize the servo motor 18 (see FIG. 3). This will drive both the shaft 15 and the rod 16 to rotate, rod 16 rotating twice as far as rod 15 because of the 2 to 1 drive ratio. This has the result that the plane of the reflector 2 will tilt through an angle equal to half of the angle through which the sensor device 8 moves to track the sun in an altitudinal direction.

Similarly, if the pair of sensors 39 of the upper array 36 receive different amounts of sunlight, the difference in the signals between these sensors is detected by the comparator device 34 and used to produce control signals to energize the servo motor 17. Motor 17 will rotate the sleeve 11 via the gear teeth engagement 19, 20 in the appropriate direction (see FIG. 3). This rotates the *plane* of the reflector 2 about the axis C, and the *pointing direction* of the sensor device about the same axis C.

These altitudinal and azimuthal direction changes will continue until sunlight strikes the lower sensor 40. At this point the upper array 36 of sensors is receiving a reduced amount of direct sunlight and will be affected by side illumination. Thus, when the comparator device detects a signal from the lower sensor 40, it de-activates, or ignores, signals from the upper array and activates, or monitors, signals from the lower array 37.

Figure 5:
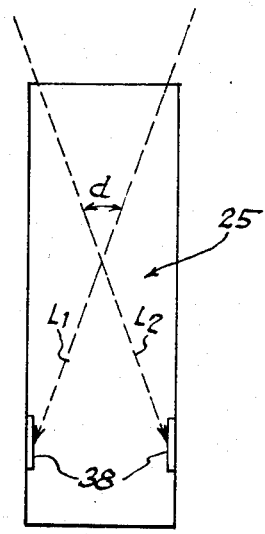
FIG. 5 is a schematic cross-sectional view of part of the sensor device of FIG. 4.

The lower array 37 of sensors will be relatively unaffected by side illumination because of its remote location. If the sun is directly overhead, the pairs of sensors 38 and 39 will receive equal amounts of sunlight because of the natural dispersion angle d of sunlight. This is illustrated in FIG. 5, which shows a vertical cross-section through the sensor assembly 25. When the sun is directly overhead, the dispersed light rays $L_1$ and $L_2$ strike the sensors 38 at the same illumination angle. If the sun's position changes, the illumination angles will be different, causing different amounts of sunlight to strike the sensors 38. The same principle applies to the other pair of sensors 39. Thus the comparator device 34 detects differences in the signals from the pair 38 or the pair 39 and produces control signals as described above so as to activate the servo motors, causing the sensor device 8 to track the sun in altitudinal and azimuthal directions, and at the same time driving the reflector 2 so that it always reflects sunlight onto the collector 6.

The other sensor assembly 26 operates in the same way. Two sensor assemblies are used in case of failure of one of the assemblies due to accumulation of dirt on the cover 33 or other problems. The comparator device 34 is used to compare signals from the active arrays of sensors from each assembly or from the sensors 40 and 40'. If there is a difference in the signals, i.e. if one of the signals falls below a certain threshold level, the assembly giving the lower signal will be de-activated and the other asembly will be monitored to produce the necessary tracking control signals. If the signals from each assembly are substantially equal, the outputs from the equivalent cells of each assembly are integrated by the comparator device 34 to produce tracking control signals.

The sensor device 8 may comprise only one sensor assembly 25 or 26, if it is to be used in relatively dirt-free areas or where some sort of alarm signal is used to notify an operator of any build up of dirt on the sensor housing.

The upper arrays of sensors 36 will normally only be active first thing in the morning when the system is first moved into an alert position with the sensor device 8 pointing straight up. Preferably the system is retracted into a sleep position facing downwards at night and moved back into its alert position in the morning by some sort of triggering device such as a light level sensor, a tone burst from the collector tower 7, or some other communication method. When the sensor device 8 points straight up in the morning the sun will be low in the sky and sunlight will be directed from the side of the sensor device 8. Thus the upper arrays 36 act as a rough positioning means until the sensor device 8 points in the approximate direction of the sun. Fine positioning is then provided throughout the day by the lower array 37, so that the sensor device 8 tracks the sun. At the same time, since movement of the reflector 2 is linked to movement of the sensor device 8 as described above, the reflector 2 will be driven to follow the angular mid-point between the sun and the collector.

Since any movement of the sun relative to the system 1 will normally be a combination of azimuthal and altitudinal components, the altitudinal and azimuthal corrections described above will take place more or less simultaneously in a series of small increments. Although the motions necessary to allow the sensor device to track the sun while the reflector moves to reflect light rays onto the collector are fairly complex, they have been provided in the system described above in a simple mounting assembly which allows the reflector and sensor device to be mounted on a single member. A simple drive mechanism links the sensor device and reflector to provide the necessary tracking movements.

The system is easy and relatively inexpensive to manufacture and operate. If desired a member of the reflective systems could be provided to be aimed onto a large scale solar energy collector.

The sensor device 8 provides a very sensitive steering mechanism for tracking movement of the sun and linking that movement to the reflector so that the reflector is moved to always reflect light rays onto the collector. The sensor device 8 itself has no moving internal parts, making it relatively reliable It will be clear that modifications can be made to the disclosed embodiment without departing from the scope of the invention. The invention is therefore not limited to the disclosed embodiment but is defined by the appended claims.

It is claimed is:

1. A reflective solar tracking system for reflecting light rays from the sun onto a remote solar energy collector, the system comprising:

a reflector for reflecting light rays from the sun onto said collector;

a mounting assembly for mounting said reflector relative to said collector so that said reflector is rotatable about a first axis pointing at the collector, and about a second axis transverse to the first for controlling elevational tilt of said reflector;

sensor means for pointing at the sun and sensing directional changes in the sun's position, said sensor means including means for producing control signals in response to said directional changes;

said mounting assembly including means for mounting said sensor means so that it is rotatable about said first axis to control its azimuthal pointing direction and about a third axis parallel to said second axis for controlling its altitudinal pointing direction; and a drive mechanism for rotating said reflector and sensor means about the respective axes of rotation in response to said control signals so that said sensor means tracks the sun and said reflector moves so as to reflect light rays from the sun onto the collector;

said mounting assembly comprising a cylindrical member adapted to be fixed in position to point along said first axis through the center of the plane of said reflector, and a sleeve rotatably mounted on said member, a mounting shaft for said reflector extending transversely along said second axis through said sleeve and being secured to said reflector on opposite sides of said sleeve, said shaft being rotatably mounted in said sleeve to control tilt of said reflector, said reflector having an opening extending transverse to said shaft through which said sleeve projects to point at said collector.

2. The system of claim 1, in which support means for said sensor means is rotatably mounted in said sleeve along an axis transverse both to said sleeve and to the pointing direction of said sensor means.

3. The system of claim 2, in which said drive mechanism includes a first part for rotating said sleeve about said first axis in response to azimuthal position changes of the sun, and a second part for axially rotating said reflector mounting shaft and said sensor support means in a one to two drive ratio in response to altitudinal position changes of the sun.

4. The system of claim 2, in which said sensor means for detecting changes in altitudinal direction incudes a first pair of solar cell sensors each of which is mounted on opposite faces of a first pair of parallel planes, said first pair of planes being essentially parallel to both said third axis and the pointing direction, and said sensor means for detecting changes in azimuthal direction includes a second pair of solar cell sensors each of which is mounted on opposite faces of a second pair of parallel planes, said second pair of parallel planes being essentially parallel to said pointing direction and essentially perpendicular to said first pair of parallel planes, the arrangement of both pairs of solar sensors being such that when said sensor means points directly at the sun, said solar cell sensors of each pair receive equal amounts of solar energy, each pair of sensors being connected to a respective comparator device for comparing signals from the sensors of that pair and producing a control signal in response to a difference in said signals.

5. The system of claim 4, in which both said pairs of sensors are arranged on the interior surface of a tube of rectangular cross section, the central axis of said tube adapted to point axially towards the sun, said pairs of sensors being operatively linked to said drive mechanism such that a first control signal produced by a comparison of the light intensities incident on each sensor of said first pair of sensors causes said sensor means to rotate about said third axis through an angle equal to twice the angle through which said reflector is rotated, and second control signal produced by a comparison of the light intensities incident on each sensor of said second pair of sensors causes said rotatable member to rotate about said first axis, with a consequent rotation of said sensor means and said reflector.

6. The system of claim 5, in which said drive mechanism comprises:
a first drive means controlled by said first control signal for rotating said reflector and said sensor means about said second and third axes, respectively, in a respective 1 to 2 drive ratio; and
a second drive means controlled by said second control signal for rotating said rotatable member.

7. The system of claim 6, in which said mounting assembly comprises a cylindrical member adapted to point at said collector along said first axis and said rotatable member comprises a sleeve rotatably mounted on said cylindrical member, said drive mechanism being mounted within said sleeve, a mounting shaft for said reflector extending transversely through said sleeve and being secured to a rear face of said reflector on opposite sides of said sleeve, said mounting shaft axis comprising said second axis, said sensor array being mounted on one end of a support rod, the opposite end of said support rod being pivotally mounted in said sleeve about said third axis, said first drive means being arranged to rotate said sleeve on said cylindrical member and said second drive means being arranged to rotate said reflector mounting shaft about said second axis and said support rod about said third axis in a 1 to 2 drive ratio, respectively.

8. The system of claim 2, wherein said sensor means includes at least one sensor assembly comprising an elongated chamber adapted to point in the direction of the sun and two spaced rectangular arrays of solar cell sensors mounted at opposite ends of said chamber, each rectangular array comprising a first pair of solar cell sensors mounted in the walls of said chamber so as to face each other in a first direction, and a second pair of solar cell sensors mounted so as to face each other in a second direction perpendicular to the first, one of said pairs of each array comprising said altitudinal direction chamber detecting means and the other of said pairs comprising said azimuthal direction change detecting means, and means are provided for activating the upper one of said arrays when the sun is positioned to one side of the assembly so that said upper array acts as a coarse positioning means, and means are provide for de-activating said upper array and activating the lower one of said arrays when sunlight is directed into said chamber, such that said lower array acts as a fine positioning means, the sensors of each array being connected to a comparator device for comparing signals from the sensors of each pair of the activated array and producing a control signal in response to a difference in said signals.

9. The system of claim 8, wherein said activating means includes a solar sensor cell mounted in the lower end of said chamber and adapted to produce a control signal to de-activate said upper array and activate said lower array when sunlight is incident on said cell.

10. The system of claim 8, wherein a second sensor assembly identical to the first-mentioned sensor asembly is provided, said sensor asemblies being mounted so as to point in the same general direction, the respective sensors of each assembly being connected to said comparator device including means for integrating the outputs of said two assemblies to produce said control signals, and means being provided for detecting a fall-off in the signal level from either assembly to below a predetermined level and for de-activating the output from that assembly on detection of such a fall-off such that said comparator device produces control signals in response to signals from the other assembly.

11. The system of claim 10, wherein said signal fall-off detecting means comprises a solar cell sensor mounted in each assembly so as to detect the level of incident sunlight.

* * * * *